United States Patent [19]

Hartman

[11] Patent Number: 4,593,507
[45] Date of Patent: Jun. 10, 1986

[54] TRENCHLESS UNDERFLOOR CONDUIT SYSTEM

[75] Inventor: Thomas W. Hartman, Pittsburgh, Pa.

[73] Assignee: Cyclops Corporation, Pittsburgh, Pa.

[21] Appl. No.: 669,074

[22] Filed: Nov. 7, 1984

[51] Int. Cl.$^4$ ............................................. E04F 17/08
[52] U.S. Cl. ........................................ 52/221; 174/48
[58] Field of Search ................. 52/334, 336, 220, 221, 52/450, 453, 126.2; 174/48, 49, 97

[56] References Cited

U.S. PATENT DOCUMENTS

| | | | |
|---|---|---|---|
| 2,073,490 | 3/1937 | Lewin | 247/3 |
| 2,912,848 | 11/1959 | Lee et al. | 52/336 |
| 3,394,514 | 7/1968 | Lindner | 52/334 |
| 3,397,497 | 8/1968 | Shea et al. | 52/334 |
| 3,592,956 | 7/1971 | Fork | 174/49 |
| 3,793,793 | 2/1974 | Dobbins | 52/221 |
| 3,886,702 | 6/1975 | Fork | 52/221 |
| 4,194,332 | 3/1980 | Fork | 52/220 |
| 4,465,897 | 8/1984 | Albrecht | 52/221 |

Primary Examiner—James L. Ridgill, Jr.
Attorney, Agent, or Firm—Buell, Ziesenheim, Beck & Alstadt

[57] ABSTRACT

A trenchless underfloor conduit system for distribution of electrical conductors, service lines and the like is disclosed. One or more spaced-apart duct members of reduced height dimension are placed over a corrugated deck. Covers are provided over selected valleys of the corrugated deck to provide at least one enclosed deck conduit extending transversely with respect to the ducts. Openings are provided in the deck conduit and overlying duct member to allow for communication therebetween. A substantially uninterrupted layer of concrete is provided over the deck and duct members and is secured to underlying supporting beams. The layer of concrete preferably has a minimum thickness of about two inches and is secured to the beams to increase the overall strength of the floor by utilizing a composite design without increasing the overall thickness or reducing the service line capacity thereof.

11 Claims, 6 Drawing Figures

TRENCHLESS UNDERFLOOR CONDUIT SYSTEM

This invention relates to a high strength floor construction including an underfloor conduit system which may be used in the distribution of various service lines beneath the floor surface. More specifically, a floor construction characterized by a thinner profile with respect to conventional flooring systems and by the absence of exposed trenches at the floor surface is provided by utilizing spaced-apart shallow duct members overlying conduits of corrugated metal decking sheets. A substantially uninterrupted layer of concrete may be provided and secured over the decking sheets and duct members to increase the strength of the floor while maintaining a minimum overall floor thickness.

It is well-known in the art to attach a metal base sheet to a corrugated sheet and utilize the enclosed crest portions or a combination of crest and valley portions of the corrugated sheet as service line raceways in underfloor wiring systems. See for example U.S. Pat. Nos. 3,592,956; 3,886,702 and 4,194,332. In most known floor systems, a single trench is provided over cellular raceway decking sheets to provide a main distribution channel for transporting service lines to the underlying cellular deck sheets. U.S. Pat. No. 3,886,702, for example, provides a trench unit which is supported on top of the crest portions of a corrugated sheet. The trench extends from the top of the crest portions up to an uppermost floor surface where cover plates are provided.

In many structures, telephone, electrical and communication lines each enter the structure at a different location. Vertically oriented ducts or shafts, often referred to as closets, are commonly provided to carry the service lines to the various floors of the structure. When the various service line closets are not provided in close proximity to one another, supplemental conduits are often required in each floor to carry the lines to the centralized location of the main feeder trench for further distribution. At or near the location where the supplemental conduits enter the main feeder trench, commonly along either an outer wall or the core of the structure, a relatively large number of service lines may be present in an area of limited space. To overcome this congestion problem, a large feeder trench is often required to accommodate the conglomeration of lines.

The need for cover plates in floor systems which utilize feeder trenches as described in U.S. Pat. No. 3,886,702 creates additional problems. Because the covers may be irregular, it is often difficult to adjust the covers to be in the same horizontal plane as the remainder of the upper floor surface. It is also difficult to neatly attach floor coverings over both the metal cover plates and the remaining floor surface, formed of concrete. Additionally, since access to the trench may be required, the floor space directly above the trench may only be used for limited purposes. As a result, trenches are often located in hallways or corridors. However, because the covers often bear irregularly on their supports, foot traffic above the trenches may cause an unacceptable level of noise or hollow sound. Further, foot traffic on the covers frequently causes an undesirable flexing thereof and does not provide the solid feel of a concrete floor.

An additional problem with floor systems utilizing a single feeder trench is created because the trenches extend up to an upper surface of the floor. As a result, the continuity of the slab is broken and it is not possible to utilize the increased strength of a composite floor design at the location of the trench by attaching an uninterrupted layer of concrete to the underlying deck, beams and girders. Providing an uninterrupted concrete layer or slab over substantially the entire floor surface and securing the layer to the underlying beams and deck sheets is highly desirable because it greatly increases the overall strength of the structure as compared with structures which utilize discontinuous, spaced-apart overlying slabs provided on opposite sides of a main feeder trench.

Some of the above mentioned problems may be overcome by the use of an electrical wiring distribution system of the type disclosed in U.S. Pat. No. 4,194,332. That system provides a main distribution unit and a transversely oriented feeder unit which each extend horizontally on the same vertical level. With that system, "a shallow covering layer of concrete" may be provided over substantially the entire surface area of the floor (Specification Col. 2, line 10). Although that system would appear to solve at least some of the above mentioned problems, at the point where the main unit and the feeder unit intersect, a complicated system of partitions and isolating members is required to properly distribute the service lines throughout the entire floor area. Additionally, the concrete layer may not be thick enough to be utilized as a structural member and is not secured to the underlying deck sheets and/or beams.

There remains a need, therefore, for a relatively simple underfloor conduit system which does not require the various service lines to be carried from remote closet locations to a common feeder trench location and subsequently distributed throughout the floor area. There further remains a need for a high strength floor and conduit system which does not provide feeder conduits on the same level as additional transversely oriented distribution conduits. Finally, there remains a need for a conduit system which allows for the provision of a layer of concrete over substantially the entire surface area of the floor in a manner which will allow the concrete to contribute significantly to the strength of the structure and to resist conduction of heat in the event of a fire thereby increasing the fire rating of the structure.

I provide a high strength trenchless underfloor conduit system in which one or more corrugated deck sheets are supported by longitudinally extending, spaced-apart I-beams. The corrugated deck sheets have alternating spaced-apart crests and valleys with an inclined webbing connecting adjacent valleys and crests. The valley and the crest portions of the corrugated sheet extend transversely with respect to the I-beams. I provide closures over selected valleys of the corrugated sheet to form one or more enclosed deck conduits through which service lines may pass. By utilizing only the valleys of the corrugated sheets as raceway conduits, I eliminate the need to provide an attached metal base sheet.

I further provide one or more spaced-apart longitudinally extending duct members of reduced height dimension which are supported by the crest portions of the deck sheets. The duct members are operably connected to the deck conduits to allow for communication therebetween. The duct members extend substantially parallel with respect to the I-beams. To increase the strength of the floor by utilizing a composite design, I prefer to secure a substantially uninterrupted layer of concrete over the beams, deck sheets and duct members. The layer of concrete preferably has a minimum thickness of about two inches directly above the duct members. With existing types of concrete, a concrete layer having minimum thickness of two inches is believed to add significantly to the overall strength of the structure. A two inch slab also satisfies the limitation for slab thickness established by the American Institute of Steel Construction for a structural slab. A thinner layer will provide a lesser degree of added strength to the structure and is considered to be within the scope of the present invention. Additionally, by providing a layer of concrete over substantially the entire surface area of the floor, conduction of heat in the event of a fire is reduced thereby increasing the fire rating of the structure.

I provide an underfloor conduit system which eliminates the need for a large, single, centralized feeder trench and the need for auxiliary conduits to carry the service lines to such a trench. I provide an underfloor system which eliminates the need for partition and isolating means where service lines pass from feeder ducts to deck conduits. I further provide a conduit system which allows for the provision of individual feeder ducts each designed to required capacities rather than providing a single feeder trench which must have the capacity to hold all of the service lines for an entire floor.

I provide an underfloor conduit system which eliminates the need for a trench which extends up to the floor surface. I prefer to provide a conduit system in which the duct members have a height dimension of approximately one inch. By utilizing individual spaced-apart ducts rather than a single feeder trench, I further eliminate the need for covers over the trench at the upper surface level of the floor. This results in a reduction of the noise level caused by a hollow space and allows for full utilization of the floor surface.

I prefer to provide a deck sheet which has a height dimension of approximately 2½ inches. I further prefer to provide an underfloor conduit system wherein the total floor thickness as measured from the top of the beam to an upper surface of the overlaying concrete layer is approximately 5½ inches. I prefer to provide an underfloor conduit system in which the layer of concrete is secured to the beams by means of a plurality of upwardly extending studs attached to the beams and the deck sheets to satisfy composite beam and floor criteria.

I still further prefer to provide an underfloor conduit system wherein the deck conduits and the duct members are operably connected by means of access housings. I prefer to use the same preset or access housing to provide access to the service lines within the deck conduits and to provide distribution means between the feeder ducts and the underlying deck conduits.

These and other advantages and features of the present invention will be understood more fully upon reference to the accompanying drawings in which I have shown certain preferred embodiments of my invention.

The trenchless underfloor conduit system according to the present invention is supported by one or more longitudinally extending beams. In most steel framed buildings or structures, a plurality of spaced-apart parallel main beams extend from one side of the structure to an opposite side. Typically, a plurality of transversely extending spaced-apart parallel girders are also provided to span the distance between adjacent pairs of beams to form a grid-like pattern of beams and girders.

Figure 1:
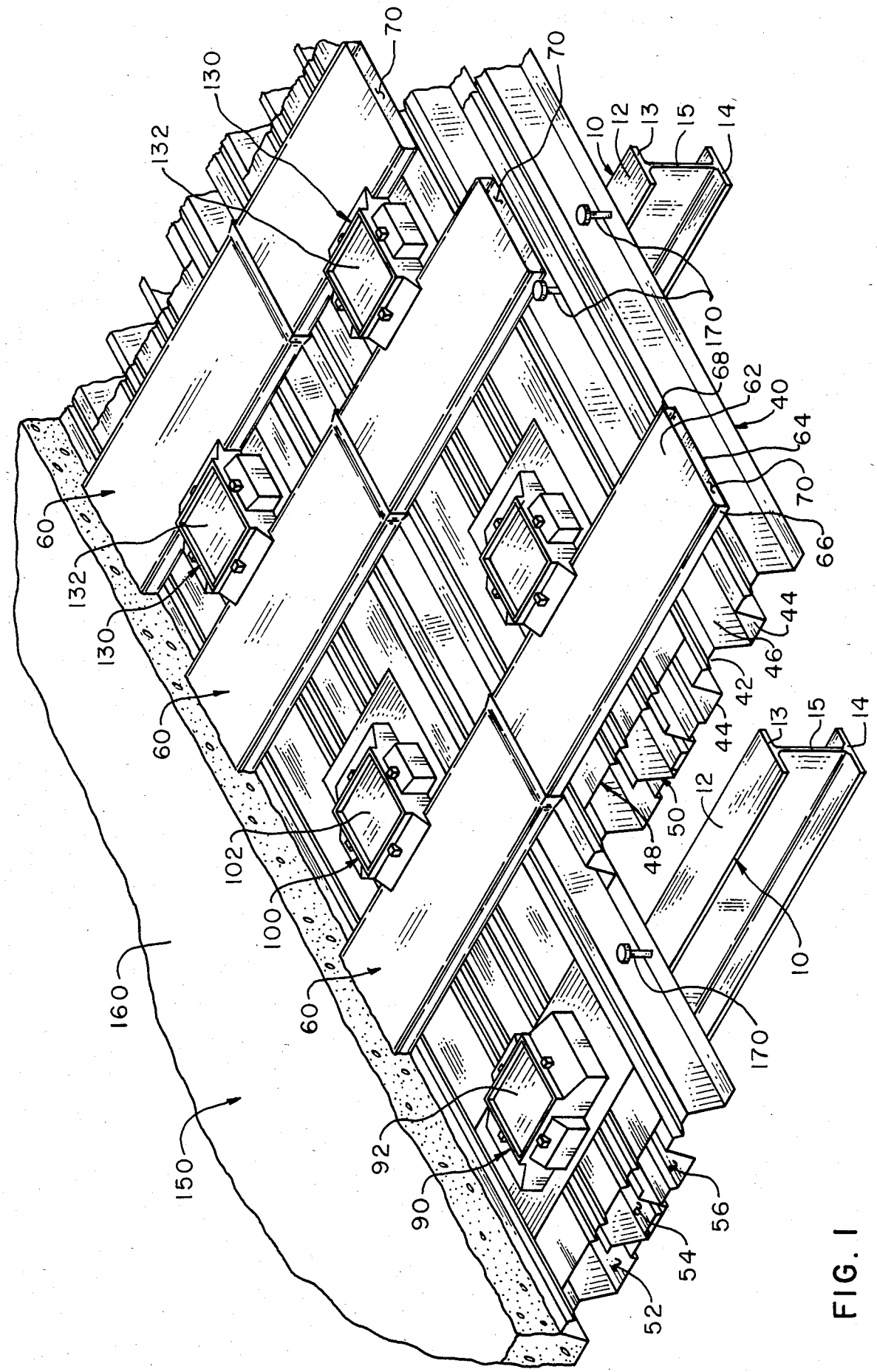
FIG. 1 is an isometric view partially broken away of a trenchless underfloor conduit system according to the present invention.
Figure 3:
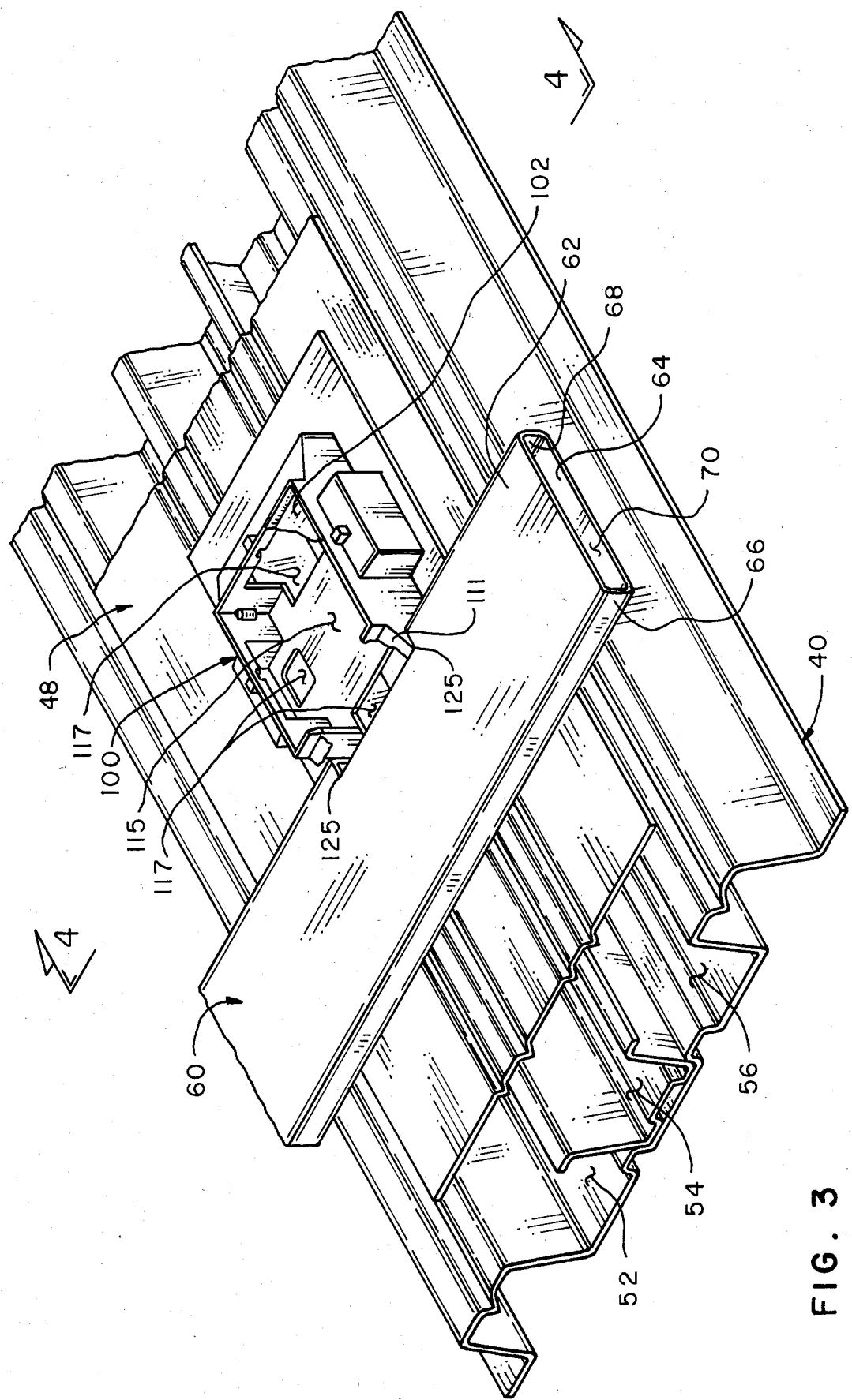
FIG. 3 is an isometric view of the access housing of FIG. 2 as connected to a fragment of a deck sheet and a feeder duct.
Figure 4:
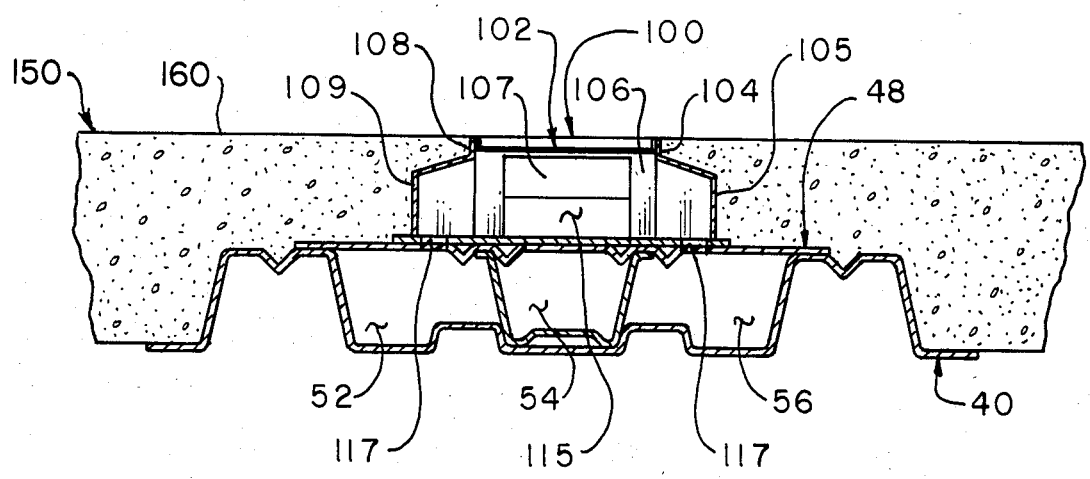
FIG. 4 is a transverse cross-sectional view taken generally on the line 4—4 of FIG. 3.

Referring to FIG. 1, beams 10 each have an uppermost surface 12, upper and lower flange portions 13 and 14, respectively, and a vertically oriented web portion 15. As mentioned above, transversely oriented spaced-apart parallel girders (not shown) may be provided to span the distance between adjacent beams 10. A deck 40 comprised of one or more corrugated metal sheets is provided. Each sheet has a plurality of spaced-apart crests 42, valleys 44 and intermediate webbing portions 46. Closures 48 are placed over selected valleys 44. A suitable dividing member, such as "U" shaped member 50 may be placed into selected valleys to separate such valleys into two or more enclosed parallel deck conduits. Three such conduits 52, 54 and 56 are shown in FIGS. 1, 3 and 4. Conduits 52, 54 and 56 extend transversely with respect to beams 10. I prefer to provide a deck 40 which has a height dimension of approximately 2½ inches. The height dimension of the deck is the vertical distance between a lower surface of a valley portion 44 and an upper surface of a crest portion 42.

Overlying deck 40, one or more spaced-apart feeder ducts 60 extending longitudinally in a direction transverse to the deck conduits are provided. Each feeder duct 60 has a generally rectangular cross sectional configuration and is comprised of upper and lower wall portions 62 and 64, respectively, and side wall portions 66 and 68. A feeder duct passageway 70 is created within duct member 60. I prefer to provide duct members 60 having a height of approximately one inch. I further prefer to provide ducts of varying width, as required, to accommodate the desired number of electrical or signal conductors or other service lines. Deck sheets 40 and ducts 60 are preferably fabricated in incremental lengths for easy assembly at a job site.

A plurality of duct members 60 may be provided to eliminate the need for a single, centralized trench which extends across the entire floor. I prefer to provide a single duct member for each service (e.g. power, communication and data) to be transported within the floor structure. I further prefer to place a duct member 60 at the location of each vertically oriented closet (not shown) where service lines are provided to the floor. In this way, I eliminate the need to provide auxiliary conduits or ducts to transport the various service lines from a plurality of remote closets to a single centralized trench.

Access housings 90 are provided at locations where access to conduits 52, 54 and 56 is required. Additional access housings 100 are provided at locations where access to a single feeder duct passageway 70 and to underlying deck conduits 52, 54 and 56 is desired. Access housings 100 are also provided at locations where it is desirable to pass service lines from a duct conduit 70 to any of said deck conduits 52, 54 or 56. Covers 92 are provided over access housings 90 and covers 102 are provided over access housings 100. Access housings 100 will be more fully described upon reference to FIG. 2 below.

If desired, an alternate type of access housing 130 may be provided where access to two adjacent feeder duct passageways 70 and to underlying deck conduits 52, 54 or 56 is desired. A cover 132 is provided over housings 130.

An overlying layer of concrete 150 is provided over beams 10, deck 40, ducts 60 and access housings 90, 100 and 130. The concrete layer preferably has a minimum thickness of at least about two inches directly over ducts 60. The upper surface 160 of concrete layer 150 substantially coplanar with access housings covers 92, 102 and 132. Concrete layer 150 is preferably secured to the underlying beams 10 by the provision of a plurality of studs 170 which are attached to and extend upwardly from the upper surface 12 of beams 10 and to deck 40 by means of embossments (not shown) on the webbing portion thereof.

I prefer to provide a total floor thickness of approximately 5½ inches as measured from top surface 12 of beams 10 to the upper surface 160 of concrete layer 150.

By providing a substantially uninterrupted layer of concrete over the beams, deck sheets and duct members, I am able to significantly increase the overall strength of the structure without increasing floor thickness or reducing service line capacity. Additionally, by providing low profile individual duct members, it is possible to eliminate the need for auxiliary conduits to carry service lines for various services to a central trench location for distribution by a main feeder trench.

Figure 2:
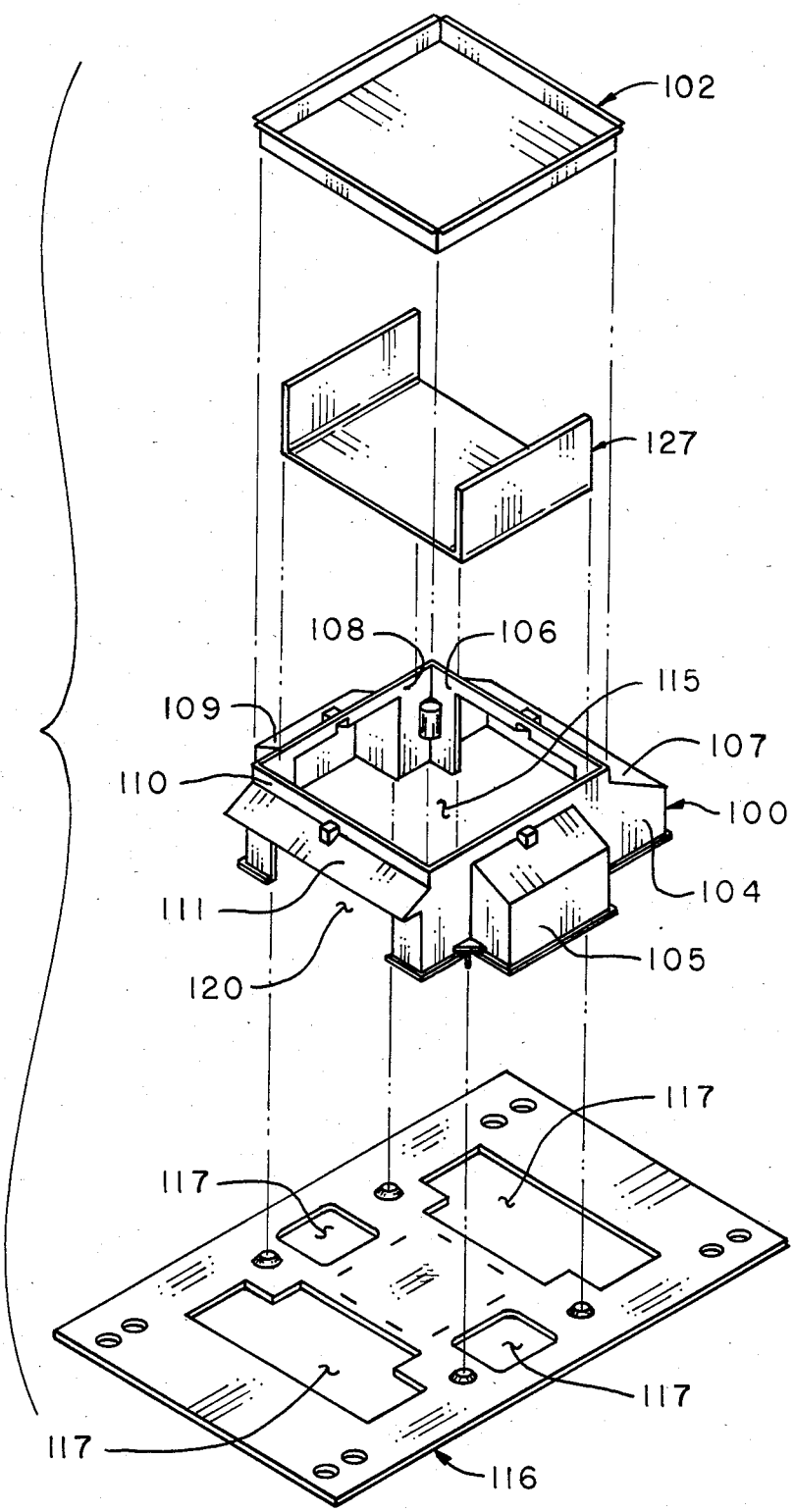
FIG. 2 is an isometric view in exploded form of one access housing which be used in the present invention.

Referring now to FIG. 2, housing 100 is generally square in plan and consists of four substantially vertical wall portions 104, 106, 108 and 110. These walls define an interior passageway 115. Each wall portion may, if desired, have a lower portion thereof which extends outwardly away from passageway 115. These portions, 105, 107, 109 and 111 extend respectively from walls 104, 106, 108 and 110. The outwardly extending portions allow access to a greater surface area of the decking sheets than would be permitted by an access housing having only vertical wall members. Additionally, the outwardly extending portions may be utilized to receive service fittings such as electrical receptacles and the like. Wall members 104, 108 and extending portion 107 of wall member 106 each extend downwardly and terminate at the location of an attached horizontal base sheet 116. Closure sheets 48 for selected valleys 44 are either provided with openings therein or are removed at locations where access housings 90, 100 and/or 130 are required. Extending portion 111 of wall member 110 has a lower portion thereof removed and does not extend downwardly to base plate 116. The removed portion forms an opening 120 sized to receive an edge portion of duct member 60 and through which service lines may pass from interior passageway 115 to and from duct member 60. When housing 100 is positioned on deck 40 as shown in FIGS. 1 and 3, opening 120 (FIG. 2) is provided in a location immediately adjacent to a corresponding opening 125 (FIG. 3) provided in wall member 68 of duct member 60. Base sheet 116 may be provided with any number or configuration of openings 117 therein to allow for passage of service lines from passageway 115 to one or more of conduits 52, 54 and 56. A suitable isolation member, such as members 127 may also be provided to cover one or more openings 117 as required. A cover 102 is also provided and is positioned in the same plane as upper surface 160 of concrete layer 150 (FIGS. 1 and 4).

Access housings 90 and 130 are substantially the same as access housing 100 described above, except that access housing 90 does not have an opening corresponding to opening 120 in a wall portion thereof and access housing 130 has two openings corresponding to opening 120 in opposite wall portions. Access housing 90, therefore, may not be utilized to directly access a duct member and access housing 130 may be utilized to access two adjacent duct members 60 as shown in FIG. 1.

Referring to FIG. 3, a fragment of deck member 40 is shown containing deck conduits 52, 54 and 56. Duct member 60 is provided over the deck member 40. As mentioned above, duct member 60 is comprised of upper duct wall 62, lower duct wall 64, and side duct walls 66 and 68. An opening 125 is provided in duct member 60 to allow for access between said duct member and the underlying deck conduits through access housing 100. Opening 125 is preferably formed in the portion of side duct wall 68 which is received by opening 120 (FIG. 2) when access housing 100 is positioned as shown in FIG. 3.

Referring to FIG. 4, passageway 115 and openings 120 (FIG. 2) and 117 of access housing 100 allow service lines within duct feeder passageway 70 to pass through duct opening 125 (FIG. 3) into any one or more of underlying deck conduits 52, 54 or 56. Additionally, service lines provided in either duct passageway 70 or in deck conduits 52, 54 and 56 may be easily accessed from above upper floor surface 160 through access housing 100.

Figure 5:
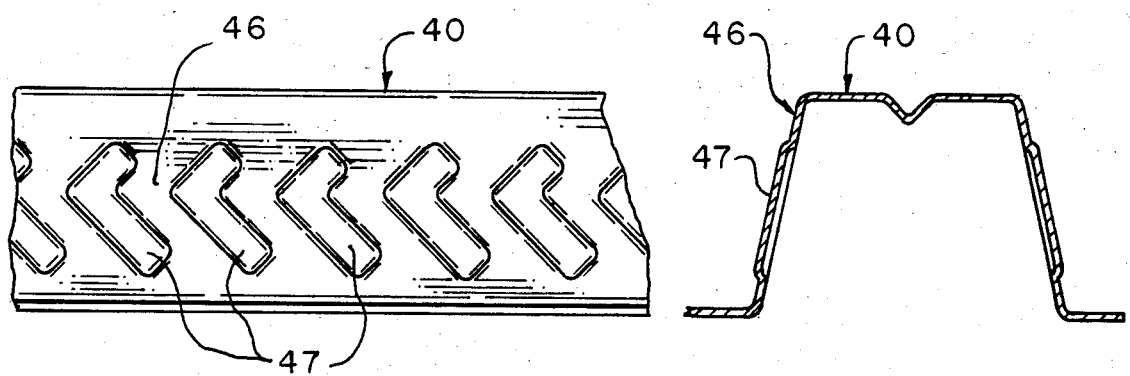
FIG. 5 is a side elevational view of a fragment of a deck sheet used in the present invention showing embossments on a webbing portion thereof.
Figure 6:
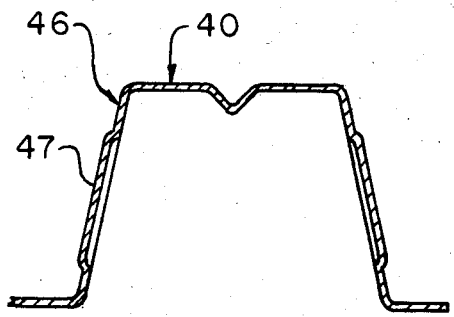
FIG. 6 is an end elevational view of a fragment of the deck sheet shown in FIG. 5.

Finally, FIGS. 5 and 6 illustrate that embossments 47 may be provided on webbing portion 46 of deck sheets 40 to aid in securing concrete layer 150 to deck 40. Embossments 47 may project outwardly, as shown, may be in the form of indentations, or may be a combination of projections and indentations.

While I have illustrated and described a present preferred embodiment of my invention, it is to be distinctly understood that the invention is not limited thereto and may be otherwise variously practiced within the scope of the following claims.

I claim:

1. A trenchless underfloor conduit system for distribution of electrical conductors, service lines and the like comprising:
   (a) at least one longitudinally extending beam;
   (b) corrugated deck sheet means supported by said at least one longitudinally extending beam, said deck means having a plurality of alternating spaced-apart parallel valleys and crests therein with a webbing connecting adjacent valleys and crests, said valleys and crests extending transversely with respect to said beam;
   (c) closure means attached to said deck means and enclosing at least one of a selected valley and a selected crest to form at least one enclosed conduit, said conduit having an access opening in a top surface thereof;
   (d) at least one enclosed duct member overlying and supported by said deck means, said at least one duct member extending substantially parallel with respect to said beam, said duct member having an opening in a side wall portion thereof;
   (e) an access housing supported on said deck means and having a removable top cover, said access housing positioned beside the duct member and having an opening in its base aligned with the opening in said conduit and an opening in a side wall portion thereof aligned with the side wall opening of the duct member whereby access into the at least one duct and into the conduit through the access housing is provided by removing the top cover and access between the at least one duct and the conduit is provided through the access housing; and (f) a substantially uninterrupted layer of concrete provided over said deck means and at least one duct member and around the access housing whereby the top cover of the access housing is substantially coplanar with an upper floor surface of the concrete layer.

2. An underfloor conduit system according to claim 1 wherein said layer of concrete over the at least one duct member has a thickness of approximately two inches.

3. An underfloor conduit system according to claim 1 wherein said at least one duct member has a height dimension of about one inch.

4. An underfloor conduit system according to claim 1 wherein said deck means has a height dimension of approximately 2½ inches.

5. An underfloor conduit system according to claim 1 wherein the total floor thickness as measured from the top surface of a beam to an upper surface of the layer of concrete is about 5½ inches.

6. An underfloor conduit system according to claim 1 wherein said layer of concrete is secured to the beams and deck means by a plurality of upwardly extending studs attached to said beams and by embossments on webbing portions of the deck means.

7. An underfloor conduit system according to claim 1 further comprising a separating member provided in at least one selected valley to separate said valley into a plurality of enclosed parallel conduits.

8. An underfloor conduit system according to claim 1 wherein a separate duct member is positioned to extend longitudinally away from each location where service lines and the like are provided to the floor.

9. An underfloor conduit system according to claim 1 wherein said corrugated deck sheet means and said at least one duct member are each provided in incremental lengths.

10. An underfloor conduit system according to claim 1 wherein a plurality of spaced-apart parallel duct members are provided on said deck means.

11. An apparatus according to claim 10 wherein said access housing has openings in two opposite side wall portions and is supported on the deck means between two spaced-apart duct members, said access housing side wall openings aligned with side wall openings of said two duct members whereby a single access housing provides access to both ducts.

* * * * *

UNITED STATES PATENT AND TRADEMARK OFFICE
CERTIFICATE OF CORRECTION

PATENT NO. : 4,593,507
DATED : June 10, 1986
INVENTOR(S) : THOMAS W. HARTMAN

It is certified that error appears in the above-identified patent and that said Letters Patent is hereby corrected as shown below:

Column 3, line 63, after the word "which", insert --may--.

Signed and Sealed this

Twenty-eighth Day of October, 1986

[SEAL]

*Attest:*

DONALD J. QUIGG

*Attesting Officer*      *Commissioner of Patents and Trademarks*